United States Patent [19]

Mikami et al.

[11] Patent Number: 4,738,502
[45] Date of Patent: Apr. 19, 1988

[54] OPTICAL DEFLECTOR

[75] Inventors: Kazuo Mikami, Kyoto; Tsukasa Yamashita, Nara; Mitsutaka Katoh, Kyoto, all of Japan

[73] Assignee: Omron Tateisi Electronics Co., Kyoto, Japan

[21] Appl. No.: 591,171

[22] Filed: Mar. 19, 1984

[30] Foreign Application Priority Data

Feb. 10, 1983 [JP] Japan .................................. 58-21123

[51] Int. Cl.⁴ .............................................. G02B 6/10
[52] U.S. Cl. ............................. 350/96.13; 350/96.14; 350/353; 350/354
[58] Field of Search ............... 350/96.11, 96.12, 96.13, 350/96.14, 96.29, 353, 354; 372/44

[56] References Cited

U.S. PATENT DOCUMENTS 4,132,464 1/1979 Maeno ................................ 350/351
4,338,577 7/1982 Sato et al. ............................ 372/44
4,370,019 1/1983 Shirasaki ............................. 350/6.6

FOREIGN PATENT DOCUMENTS 97027 6/1983 Japan ................................. 350/96.12

OTHER PUBLICATIONS

Liu et al., Proceedings of the IEEE, May 1965, "Optical Beam Deflection by Pulsed Temp. Gradients in Bulk GaAs", pp. 522–523.
Haruna et al., Electronics Letters, 17(22), Oct. 29, 1981, "Thermooptic Effect in LiNBO₃ for Light Deflection and Switching", pp. 842–844.

Primary Examiner—William L. Sikes
Assistant Examiner—Frank González
Attorney, Agent, or Firm—Wegner & Bretschneider

[57] ABSTRACT

An optical deflector comprises a photo-conductive material having a temperature optical effect and formed with a propagation path for light which propagates in a predetermined direction, a heating and cooling member disposed on the surface of the light propagation path of the photo-conductive material and which effect heat generation operation for heating the photo-conductive material and endothermic operation for cooling the same to produce the distribution of refractive index corresponding to the temperature distribution formed by each operation, in the light propagation path, and a drive DC source to have the heating and cooling member effect the heat generation operation and endothermic operation.

5 Claims, 3 Drawing Sheets

OPTICAL DEFLECTOR

BACKGROUND OF THE INVENTION

This invention relates to an optical deflector which can change the index of refraction of a photo-conductive material transparent relative to light to thereby deflect a course of light.

Recently, with the development of photo-electronic appliances such as photo-video disc and photo-communication system, the development of an optical deflector which can freely deflect the course of light has been an urgent subject, and optical deflectors which makes use of various effects have been proposed.

Optical deflectors heretofore proposed make use of an electric field (electro-optical effect), magnetic field (magnetic optical effect) or surface accoustic wave (acoustic optical effect). For example, in the optical deflector making use of the electro-optical effect, a thin film waveguide is formed on the substrate (such as LiNbO$_3$) and an electric field is applied to the thin film waveguide. Then, distribution of refractive index of the thin film waveguide varies with the applied electric field to deflect the projected lightbeam.

However, since in the optical deflector heretofore proposed, the deflection angle depends upon the polarized surface of an incident light beam, it is difficult to obtain a predetermined deflection angle unless means for arranging in advance the polarized surface of the incident light beam is provided.

In addition, if the film thickness of the optical waveguide is made greater, the effect is different in a direction of depth, and therefore, it is difficult to form a thick film waveguide.

SUMMARY OF THE INVENTION

It is an object of the present invention to provide an optical deflector which makes use of temperature optical effect.

In accordance with the present invention, change in temperature is provided for the photo-conductive material to thereby vary the distribution of refractive index, and therefore, the incident light beam can be deflected at the predetermined deflection angle. Furthermore, a film thickness of the optical waveguide can be increased, and therefore, an optical waveguide of bulk type may be obtained.

BRIEF DESCRIPTION OF THE DRAWINGS

FIG. 6 (b) is a view for explaining the operation of apparatus in accordance with the second embodiment.

DETAILED DESCRIPTION OF THE INVENTION

Figure 1:
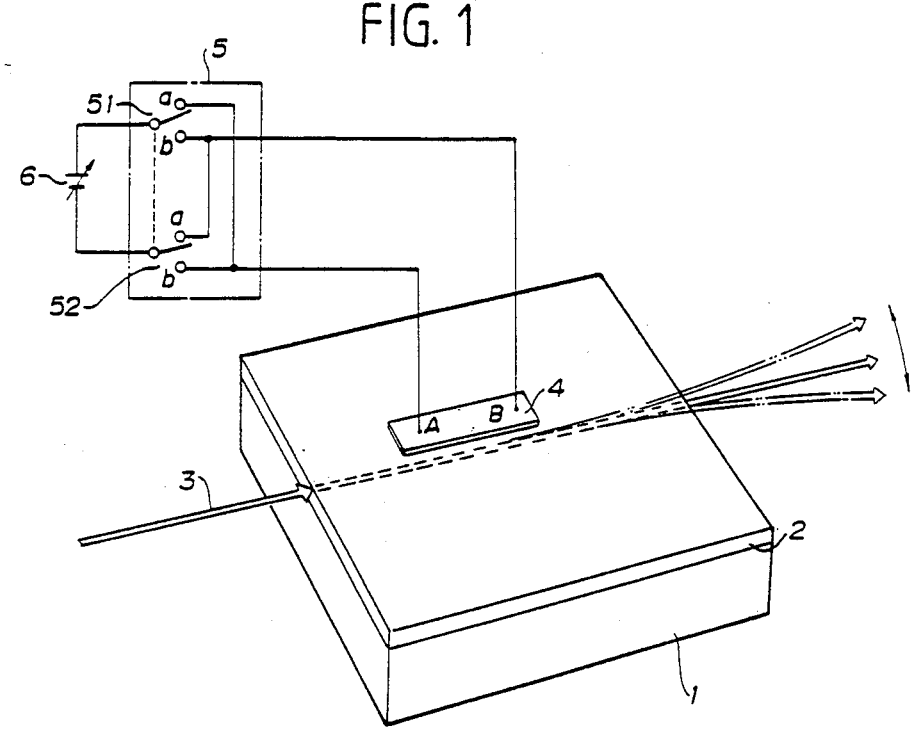
FIG. 1 is a schematic view showing an optical deflector in accordance with one embodiment of the present invention.

FIG. 1 is an optical deflector in accordance with one embodiment of the present invention.

In the figure, on the upper surface of a substrate 1 is formed a thin film optical waveguide 2, and a light beam 3 is incident upon one side end of the thin film optical waveguide 2. The light beam 3 propagates within the optical waveguide 2 and is released outside from the other end thereof.

On the surface of the optical waveguide 2 is disposed a Peltier effect element 4 in the shape of film sheet along the propagation path of the light beam 3. The Peltier effect element 4 has terminals A, B, to which power is supplied from a variable DC power supply 6 through a switching circuit 5.

The switching circuit 5 has two swicthes 51 and 52 which are interlocked, and when switched to terminal (a), an electric current flowing from terminal A towards terminal B is supplied to the Peltier effect element 4, and when switched to terminal (b), an electric current flowing from terminal B towards terminal A is supplied to the Peltier effect element 4.

The Peltier effect element 4 is provided to effect heat generation operation at one surface of both sides in the thickness direction and to effect endothermic operation at the other surface depending on the direction of the current flowing between the terminals A and B. That is, by switching the polarity of the current flowing between the terminals A and B by the switching circuit 5, the heat generation and endothermic operations may be performed at the lower surface in contact with the thin film optical waveguide 2 of the Peltier effect element 4.

As a consequence, in the light propagation path in the vicinity of the Peltier effect element 4, the distribution of the refractive index is reversed, and the light beam releaed from the other end of the thin film optical waveguide 2 is suitably deflected in angle around the straightly moving light beam (shown at the solid line) in the plane of the optical waveguide 2. In this direction action, the deflection angle is made constant irrespective of the polarized surface of the incident light beam 3.

Next, the deflection operation will be explained with reference to FIGS. 2 and 3.

Figure 2:
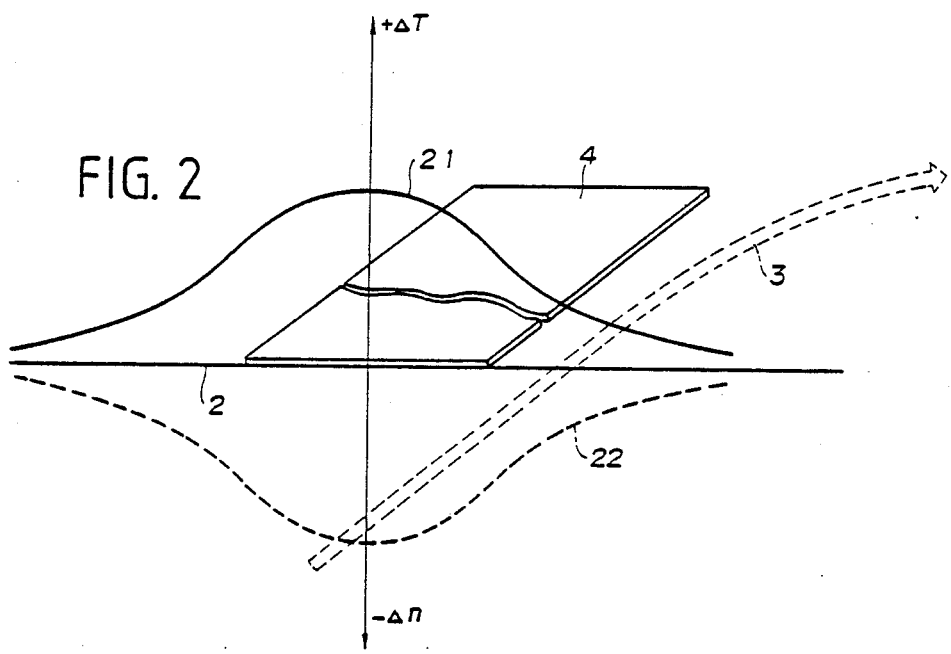
FIGS. 2 and 3 are views for explaining the operation of the apparatus in the above-described embodiment.
Figure 3:
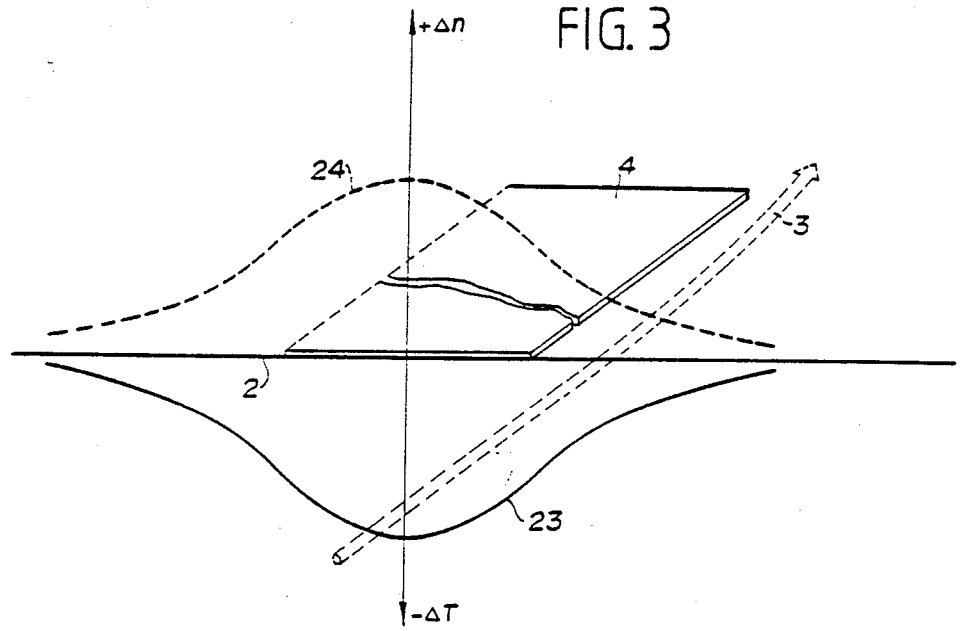

FIG. 2 shows the case where the Peltier effect element 4 effects heat generation operation while FIG. 3 shows the case where the Peltier effect element 4 effects endothermic operation. Here, the substrate 1 is formed from a plastic sheet, and the thin film waveguide 2 is formed from a high polymer film.

In FIG. 2, it is supposed that switches 51 and 52 are switched, for example, to terminal (a), and when the current flowing from terminal A towards terminal B flows into the Peltier effect element 4, the high polymer film 2 is heated. Then within the high polymer film 2 as shown by the curve 21, there will be the maximum temperature directly below the Peltier effect element 4, and the positive temperature distribution ($+\Delta T(°C.)$) which lowers in temperature as it moves away in the width direction of the Peltier effect element 4. As a consequence, the refractive index of the high polymer film 2 is the lowest at the peak of temperature distribution, as indicated by the curve 22, and assumes the negative distribution of refractive index ($-\Delta n$) wherein the refractive index slowly increases as the temperature distribution decreases.

That is, in the propagation path of the light beam 3 passing through one side widthwise of the Peltier effect element 4, the refractive index is small on the side of the Peltier effect element 4 and the refractive index increases as it moves away from the Peltier effect element 4. As is known, the propagation speed of light is proportional to a reciprocal number of refractive index, and therefore, speed of light passing through the Peltier effect element 4 whose refractive index is small is greater than that of light passing through a point distanced from the Peltier effect element 4 whose refractive index is large. As a result, as the light beam 3 entered parallel to one longitudinal direction of the Peltier effect element 4 passes through the side of the Peltier effect element 4, the wave surface of the light is inclined in a direction away from the Peltier effect element 4, and the course of the light is curved.

On the other hand, FIG. 3 shows the case where, conversely to the case of FIG. 2, the switches 51, 52 are switched to the terminal b, and in the Peltier effect element 4, current flows from the terminal B to terminal A, wherein the high polymer film 2 is cooled. Then, within the high polymer film 2, as shown by the curve 23, there will be the minimum temperature directly below the Peltier effect element 4, and the negative temperature distribution ($-\Delta T(°C.)$) as it moves away in the width direction of the Peltier effect element 4. And, the refractive index of the high polymer film 2 is the maximum at the minimum peak of temperature distribution, thus obtaining the distribution of refractive index of positive direction ($+\Delta n$), as indicated by the curve 24, where the refractive index decreases as the temperature rises.

That is, in the distribution of refractive index in the propagation path of light beam 3, conversely to the case explained in connection with FIG. 2, the refractive index becomes large at a position close to the Peltier effect element 4 and becomes small at a position away therefrom. As a result, the light beam 3 passing through the side of the Peltier effect element 4 is deflected in course towards the Peltier effect element 4.

Figure 4:
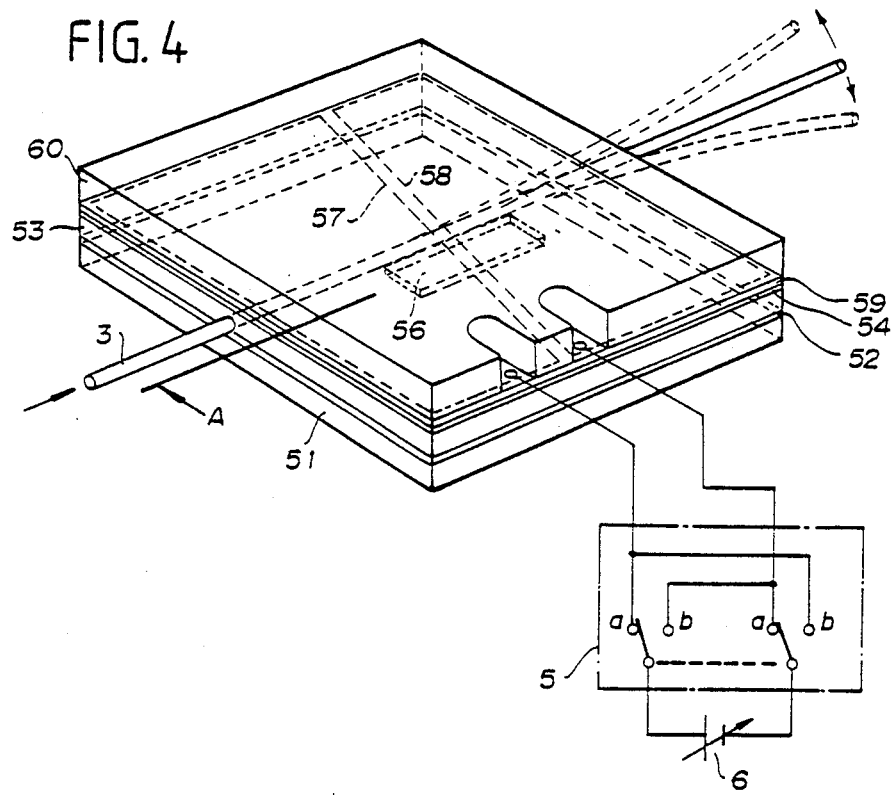
FIG. 4 is a perspective view showing the specific structure of the apparatus in the above-described embodiment.
Figure 5:
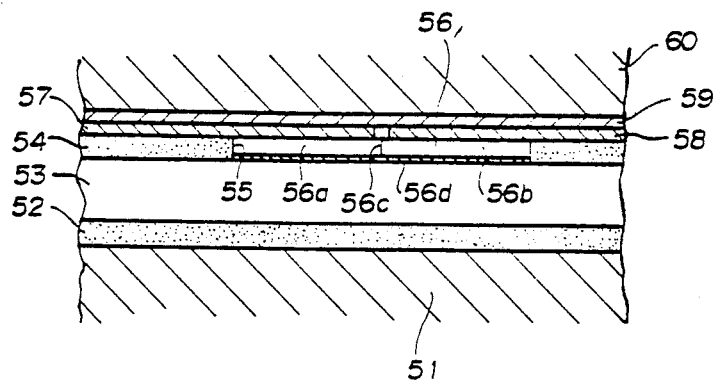
FIG. 5 is a schematic sectional view in side taken on line A of FIG. 4.

The thus described optical deflector can be constructed for example, as shown in FIGS. 4 and 5.

In these figures, a substrate 51 is formed from a plastic sheet, and a clad layer 52, a high polymer film 53 and a clad layer 54 are laminated in said order on the upper surface of the plastic sheet.

The high polymer film 53 is formed by blending bisphenol polycarbonate PCZ as body material, acrylic ethyl MA as monomer, methylene chloride $CH_2Cl_3$ as solvent, benzoin-ethylene BZEE as photosensitizer and hydroquinone HQ as inhibitor to form a cast solution, which is semihardened into a sheet by a casting method.

The clad layers 52, 54 are formed of a member which is smaller in refractive index than that of the high polymer film 53 and function to confine the light beam incident on the high polymer film 53 within the high polymer 53 for propagation.

The clad layer 54 is formed with a rectangular square hole 55 and a Peltier effect element 56 is adhered to the surface of the high polymer film 53 exposed therefrom.

The Peltier effect element 56 has an electrode layer (Au) 56d vaporized on the contact surface with the high polymer film 53. This Peltier effect element 56 is that a joined surface between n type telluric bismuth (n-$Bi_2Te_3$) 56a and p type telluric bismuth (p-$Bi_2Te_3$) 56b is insulated a coating film 56c.

Electrode layers, 57, 58 (both are Au layers) are vaporized on the upper surface of the clad layer 54 and Peltier effect element 56. The electrode layers 57, 58 are divided into two sections so as to obliquely cross with the light propagation path of the light beam 3, one electrode layer 57 coming into contact with the n type telluric bismuth 56a while the other electrode layer 58 coming into contact with the p type telluric bismuth 56b. These electrode layers 57, 58 have the film thickness of 6000 $\mu$m and are connected to the switching circuit 5.

On the upper surfaces of the electrode layers 57, 58 are disposed mica films 59 which are electrically insulative and are thermally good conductive, and on the upper surface thereof is provided a heat sink 60 in which an aluminium alloy is processed. The contact surface between the heat sink 60 and the mica film 59 is coated with grease and adhesives to improve heat transfer.

With this construction, when the switching circuit 5 is operated toward the terminal a of the switch, + voltage is applied to the electrode layer 57 and − voltage applied to the electrode layer 58. Then, electron of the n type telluric bismuth 56a is attracted by the electrode layer 57 and hole of the p type telluric bismuth 56b attracted by the electrode layer 58. As a consequence, a current flow in a direction of electrode layer 57→n type telluric bismuth 56a→electrode layer 56d→p type telluric bismuth 56b→electrode layer 58. When current flows in said direction, heat absorption occurs in contact surface between the electrode layer 56d and n type telluric bismuth 56a and p type telluric bismuth 56b due to the known Peltier effect. Thus, a predetermined part of the high polymer film 53 in contact with the electrode layer 56d is cooled, and the temperature distribution and refractive index distribution shown in FIG. 3 are formed in the high polymer film 53.

On the other hand, when the switch of the switching circuit 5 is operated to be switched towards the terminal b, − voltage is applied to the electrode layer 57 and + voltage applied to the electrode layer 58. Then, conversely to the foregoing, current flows in a direction of electrode layer 58→p type telluric bismuth 56b→electrode layer 56d→n type telluric bismuth 56a→electrode layer 57, and therefore, heat generation ocurrs in contact surface between the electrode layer 56d and the n type telluric bismuth 56a and p type telluric bismuth 56b. As a consequence, the temperature distribution and refractive index distribution as shown in FIG. 2 are formed in a predetermined part within the high polymer film 53.

It is noted that where the laser beam of single mode is deflected by the optical deflector in accordance with the first embodiment as described above, it is suggested that the film thickness of 5 to 10 $\mu$m of the high polymer film as the thin film waveguide can be used. Where the laser beam of multi-mode is deflected, it is suggested that the film thicness of approx. 50 $\mu$m of the high polymer film can be used.

It will be of course that the thin film waveguide can be formed with other material besides the high polymer film, for example, of ferroelectric material such as LiN$bO_3$, amorphous material such as glass, and polycrystal material such as PLZT.

Figure 6A:
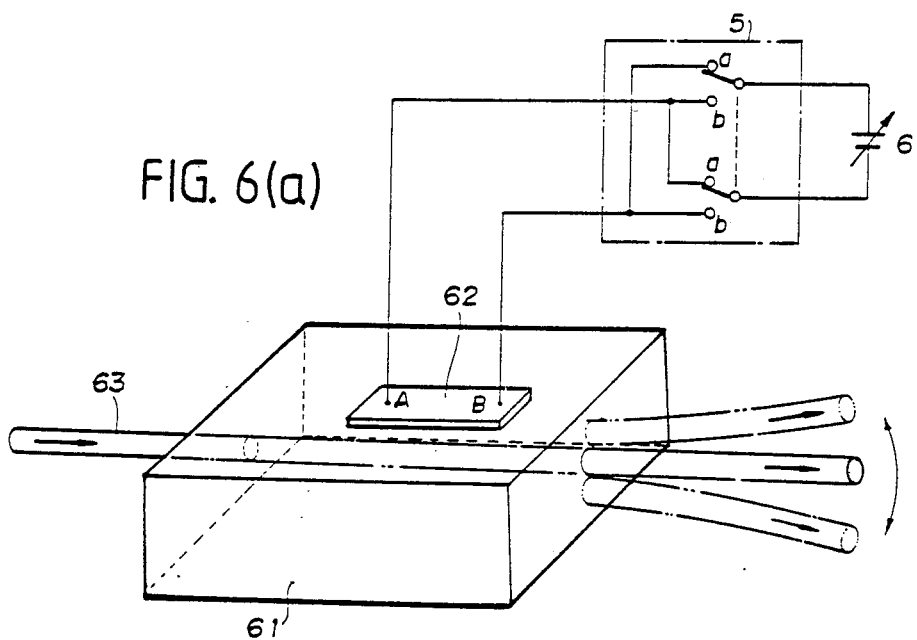
FIG. 6 (a) is a schematic view showing an optical deflector in accordance with another embodiment of the present invention.
Figure 6B:
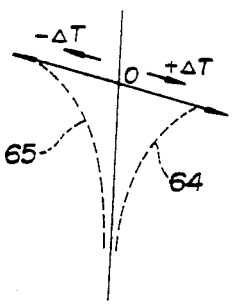

Next, FIG. 6 shows an optical deflector in accordance with another embodiment of this invention. In the optical deflector in accordance with the second embodiment, a Peltier effect element 62 is disposed on the upper surface of bulky photo-conductive material 61, and power is supplied from a variable DC power supply 6 to terminals A, B of the Peltier effect element 62 through a switching circuit 5.

The bulky photo-conductive material 61 is formed of high polymer material formed of agents described in the above-described first embodiment, amorphous material such as glass, polycrystal material such as PLZT or ferroelectric material such as $LiNbO_3$. The Peltier effect element 62 is the same element as shown in the above-described first embodiment.

In the thus constructed optical deflector, a light beam 63 incident upon one side of the photo-conductive material 61 is made to be incident so as to pass through directly below the Peltier effect element 62. When the switching circuit 5 is switched to cause the Peltier effect element 62 to effect heating or cooling, the temperature distribution directly below the Peltier effect element 62 is as shown in FIG. 6 (b).

That is, the Peltier effect element 62 is caused to generate heat, the photo-conductive material 61 will have the maximum temperature at the contact surface with the Peltier effect element 62 as shown by the curve 64, and will have the temperature distribution which decreases in an exponential functional fashion depthwise. When the Peltier effect element 62 is caused to absorb heat, there will have the minimum temperature at the contact surface with the Peltier effect element 62 as shown by the curve 65 and will have the temperature distribution which increases in temperature in an exponential functional fashion depthwise. Thus, the distribution of the refractive index directly under the Peltier effect element 62 of the photo-conductive material 61 is one obtained by inverting the curve 64 or curve 65, and the light beam 63 propagating directly under the Peltier effect element 62 is deflected within the plate vertical to the surface of the photo-conductive material 61 on which Peltier effect element 62 is disposed. This deflecting has nothing to do with the polarized surface of the incident light beam and is uniform in depthwise.

While in the above-described embodiments, an optical deflector as a single body has been shown, it will be noted of course that the optical deflector may comprise one element of the optical IC.

What is claimed is:

1. An optical deflector comprising:
   a photo-conductive material having a temperature optical effect and formed with a propagation path for light which propagates in a predetermined direction;
   a heating and cooling member disposed on the surface of the light propagation path of the photo-conductive material and which effects a heat generation operation to heat said photo-conductive material and which effects an endothermic operation for cooling the same to produce a distribution of refractive index in the light propagation path corresponding to the temperature distribution formed by each operation; and
   a drive DC source which applies power to the heating and cooling member and which effects thereby the heat generation operation and endothermic operation.

2. An optical deflector according to claim 1 wherein the heating and cooling member comprises a Peltier effect element, and the power is applied to said Peltier effect element while being changed in polarity through a switching circuit.

3. An optical deflector according to claim 1 wherein the photo-conductive material forms a thin film waveguide.

4. An optical deflector according to claim 1 wherein the photo-conductive material is in the form of bulky configuration.

5. An optical deflector according to claim 1 wherein the photo-conductive material comprises a high polymer material.

* * * * *